May 24, 1966 S. W. SMITH 3,252,570
DOCUMENT SORTING
Filed Dec. 28, 1962 3 Sheets-Sheet 3
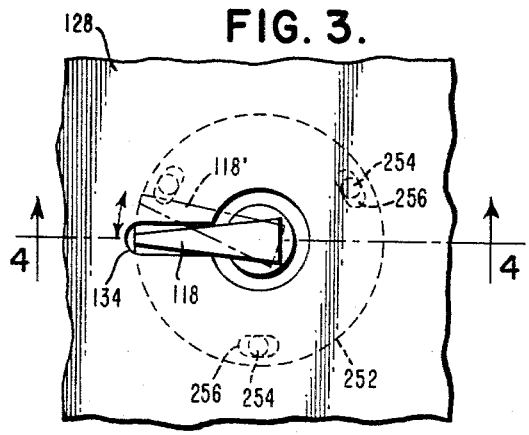
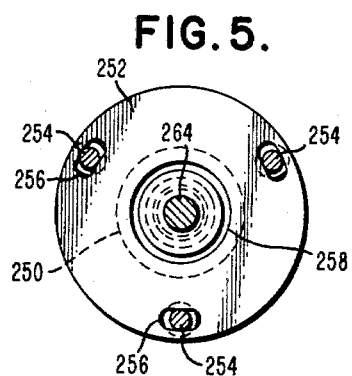
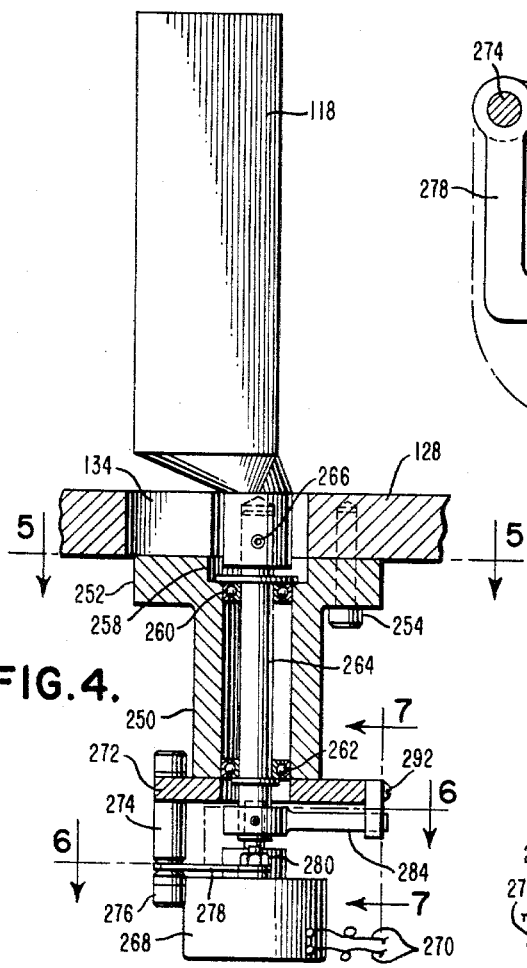
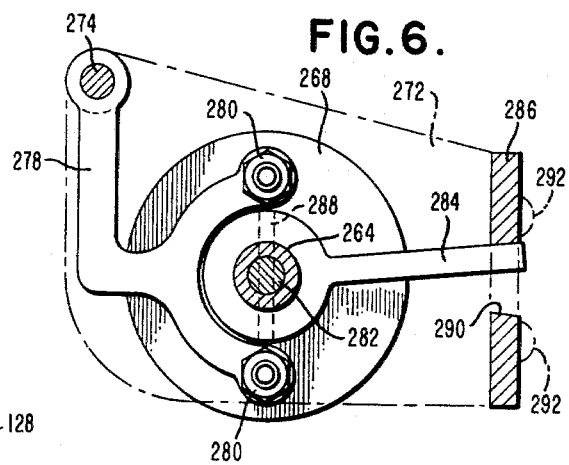
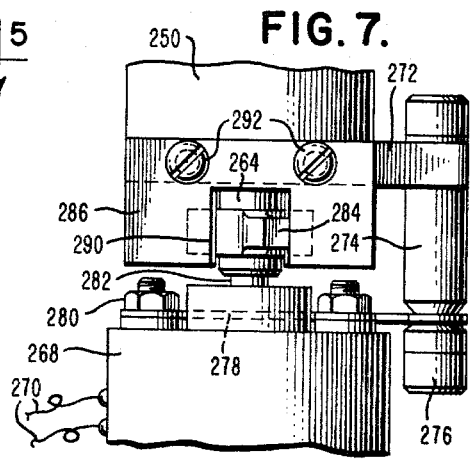

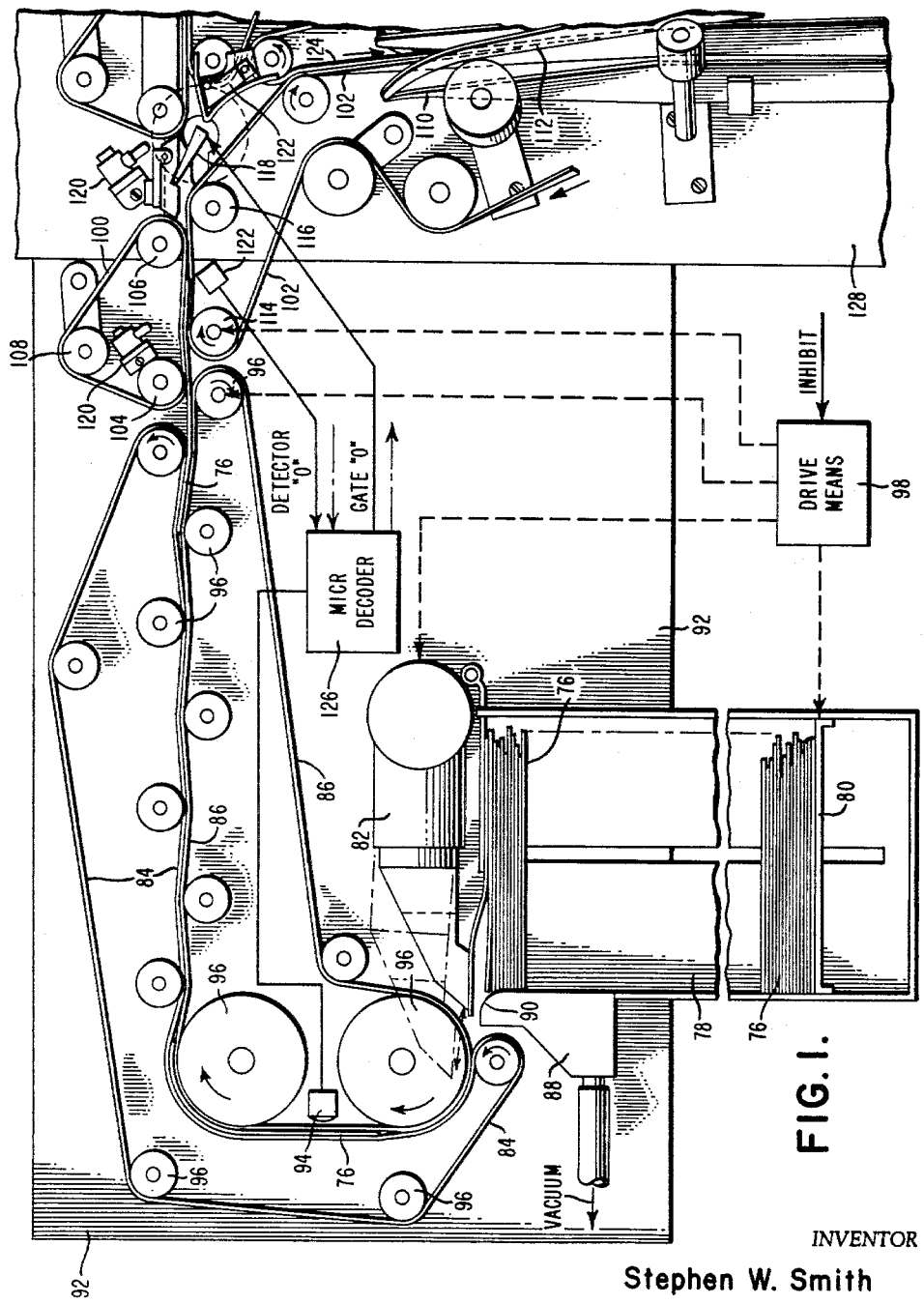
FIG. I.
INVENTOR
Stephen W. Smith
BY John R. Manning
ATTORNEY

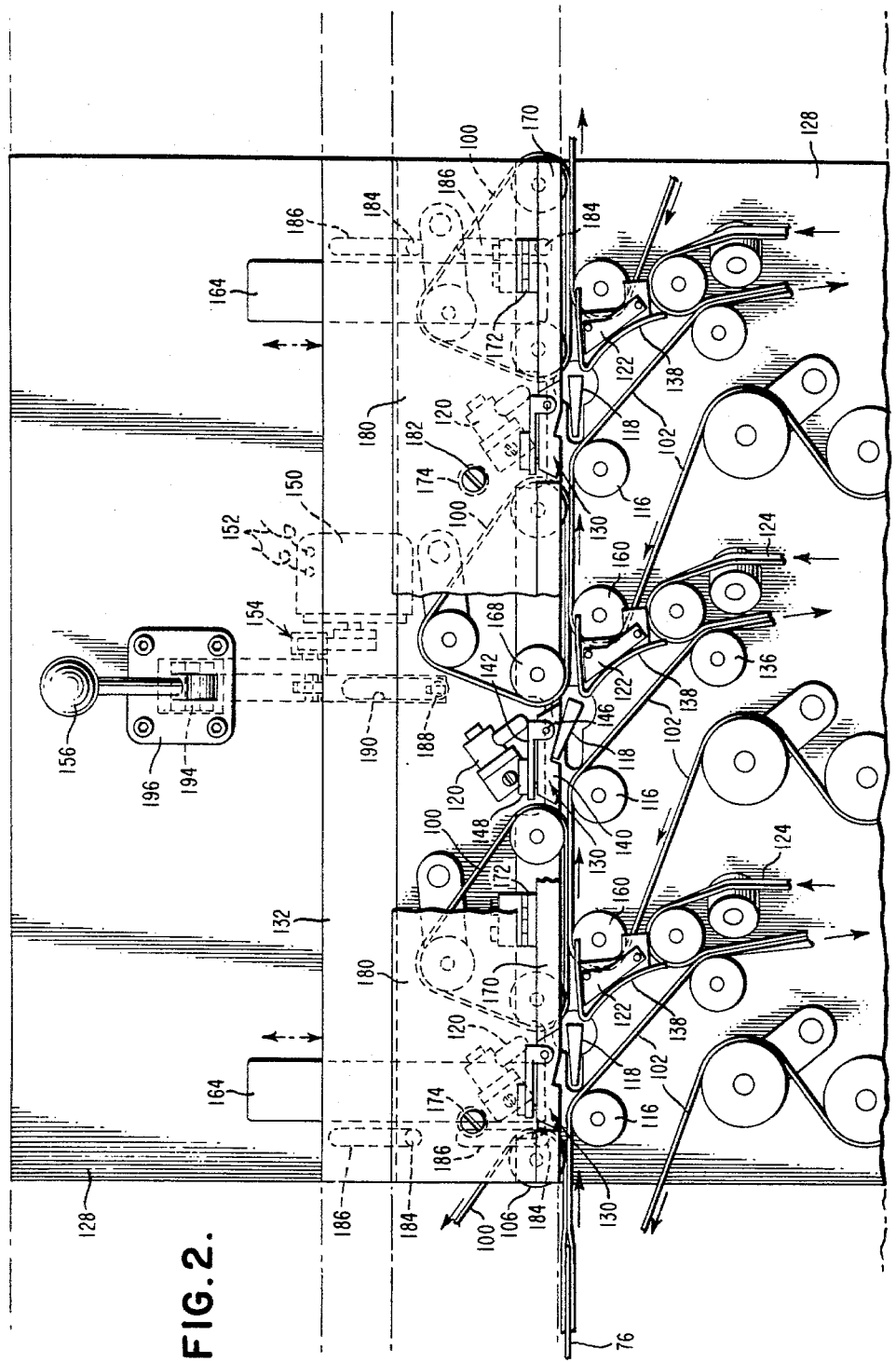

United States Patent Office 3,252,570
Patented May 24, 1966

3,252,570
DOCUMENT SORTING
Stephen W. Smith, Dallas, Tex., assignor to Sperry Rand Corporation, New York, N.Y., a corporation of Delaware
Filed Dec. 28, 1962, Ser. No. 248,099
4 Claims. (Cl. 209—74)

This invention relates to document sorting and more specifically to document diverting means for causing a document to be diverted from the common document path to an output pocket or hopper.

Commercial operations of the present day require the processing of great numbers of documents. One such business operation which has received the full impact of processing large numbers of documents is the banking industry. Bank drafts and checks are presently used for the payment of goods, services, etc., to the exclusion of practically any other method of payment. Accordingly, as our economy advances, increasing numbers of bank checks and documents are drawn on the depositor institution.

The typical banking institution of the past has had to maintain a large staff of clerical assistants for the processing of the checks, drafts, deposit slips, etc. Manual operations for these clerical assistants were required for the posting of the checks and deposit slips to the customers' account. These large staffs of clerical people are expensive to maintain; they process documents at a relatively slow rate; and, are inefficient in that a great number of errors are committed. Accordingly, it is necessary that some mechanical and/or electronic means be devised to quickly and accurately process the bank documents at a minimum charge or cost to the banking institution.

As noted, as our modern businesses have increased in size and complexity, automatic means must be utilized for the handling of these business documents generated as a result of business transactions of the depositor. In addition, institutions or industries involving sales, transportation, as well as banks and the like, are faced with the problem of sorting and accounting on a day-to-day basis for documents such as the checks, deposit slips, tickets, sales slips, etc. in such quantity that manual handling of these business documents becomes prohibitive and is almost a hopeless undertaking. Although several systems have been devised in working toward a solution to this problem, it appears that the use of human language symbols printed in magnetic ink on the documents themselves, in conjunction with equipment capable of recognizing these symbols automatically, is perhaps the most practical means for minimizing the manual handling of the documents.

A device for automatically sorting documents such as bank checks is the high speed MICR (Magnetic Ink Character Recognition) check sorter presently known in the art. As the documents are individually and successively advanced past a magnetic reading station, the magnetic numbers formed upon the face of the check are interpreted and the document is directed to an output pocket according to the magnetic code placed thereon. High speed document sorters will operate and sort documents at upwards of 1800 documents per minutes. When operating at these high speeds, it is necessary that the documents be positively gripped and driven and not be allowed to "float" during their travel. Floating documents will slow down and attain speeds of less than the desired speed and thus cause a succeeding document to be forced against the earlier documents and result in a jammed condition. It is inevitable that a jam may occasionally occur in the system. If a document sorting operation is to be successful, the conditions causing jams must be studied and the equipment so designed as to minimize the loss of time attributable to clearing the machine of jammed documents. The present invention relates to a document diverter or document gate for altering the path of the documents. The sorting device is constructed in such a manner that the documents pass along a common document path or way. Means are provided at successive positions along the document way for diverting the document from the common document path into other means which stacks the document and places the sorted document in the proper output pocket. When operating at these high speeds, it is possible that the document gate may be actuated at a rate equal to the document sorting speed if a condition should occur wherein several successive documents are to be placed in the same output hopper or pocket. Accordingly, if document jams are to be minimized and check multilation reduced, the document gate must open quickly, divert the document from the common path to its output pocket, and then return to its closed position before the arrival of the next document. As noted, it may be necessary for the document gate to open, divert the document and close in less than 30 milliseconds. It is in this light that the present invention has been made, eliminating many limitations inherent in previous document sorting operations.

Many document diverters or gates known in the prior art have been unsuccessful in operations at high speeds. If the gate does not open on command, the document will not be sorted into the correct pocket. If the document gate opens before the document arrives at the proper station, then the gate may engage an earlier document and cause it to crumple and tear and to upset the sorting routine. If the document gates closes before the document has been diverted, the diverted document will be engaged by the gate and cause a jam condition.

Accordingly, it is desirable that document diverting means be devised which will operate at the high speed requirements of present day sorting operations and to open quickly and at the time immediately upon receipt of a command to actuate the particular gate. A device of the present type described in the present invention will reduce document jams and prevent the multilation of otherwise sortable documents presented to the document sorting system. If document jams are practically eliminated then the "down time" of the sorting system is correspondingly reduced which results in greater efficiency of the system.

Accordingly, it is the principal object of this invention to improve document sorters.

It is another object of the present invention to improve document sorters capable of processing bank documents, such as checks, at high rates of speed.

It is a further object of the present invention to reduce the number of document jams in a high speed document sorting system.

It is a still further object of the present invention to reduce the number of documents mutilated in high speed document sorting operations.

It is still another object of the present invention to provide a means for diverting documents from the common document path to an output pockets in a high speed document sorting system.

It is a still further object of the present invention to provide a document gate which is quickly and easily removed from the document sorter for maintenance and repair.

To accomplish these and other objects, means are provided for receiving the documents to be sorted in an input hopper and for advancing the documents toward a picker arm. As the document is presented to the picker arm, the document is swiftly and individually passed in front of a document doubles preventer and into a pair of flexible belts. The width of the belts is much less than the width of the checks so that the magnetic numbers placed on the lower face of the document may be read by a magnetic reading head positioned along the check or document way. The document is then advanced by the frictional engagement of the flexible belts to a series of document presence detectors and jam detectors and past a series of gates positioned along the document path. As a result of reading the magnetic characters placed upon the document, one of the series of gates will be actuated and cause the document to be diverted from the common document path to one of the second paths which leads to an output pocket. If a jam is detected by a jam detector, then the system is inhibited and all operations stopped so that the jam can be quickly cleared.

The document diverter or gate of the present invention is of unitary construction. A movable shaft is securely mounted within a housing. The deflecting member of the gate is coupled to one end of the shaft in a cantilever manner. The opposite end of the shaft is secured to a solenoid capable of rotational movement. The solenoid is connected to the housing and appropriate stops are provided to limit the rotational movement of the shaft. The gate is biased in a closed position. Upon actuation of the solenoid, the shaft will be rotated thus causing the diverting member of the gate to be moved from its closed position to its open position. Means are provided between the coupling of the solenoid to the housing to provide for the small linear travel of the solenoid. A key-shaped hole is formed in the base member of the document sorter at the position where the document is to be diverted from the common path to the secondary path or belt system leading to the output pocket. The diverting means is inserted into this aperture with the deflecting member extending up into and next to the document path. The housing, shaft, and solenoid remain below the base member of the document sorter. Means are provided to secure the housing to the underside of the base member of the document sorter. Upon actuation of the solenoid, the deflecting member will extend into the document path and thus divert the document into the output pocket. If it is necessary to remove the document diverting means, the securing means are quickly released from their connection with the base member of the document sorter and another gate may be inserted and so secured.

In addition, a decoding means is provided to receive the output from the magnetic reading station for actuating one of the document gates or diverters according to the magnetic code upon the individual document.

These and other objects of this invention will be brought out more fully in the following description of an illustrative embodiment thereof, when considered in connection with the accompanying drawings, wherein like reference characters refer to like or similar parts, and in which:

FIGURE 1 is a plan view of the sorting system;

FIGURE 2 is a plan view of the document sorting gates and the movable carriage assembly forming one side of the document path;

FIGURE 3 is a plan view of the document diverter or gate;

FIGURE 4 is an enlarged sectional view of the document gate taken along the lines 4—4 of the FIGURE 3;

FIGURE 5 is a sectional view of the adjusting means of the gate and taken along the lines 5—5 of the FIGURE 4;

FIGURE 6 is a sectional view taken along the lines 6—6 of the FIGURE 4; and

FIGURE 7 is a sectional view taken along the lines 7—7 of the FIGURE 4.

As shown in the FIGURE 1, the documents or checks 76 are placed in an input hopper 78. A backup plate 80 is positioned against the last document in the stack for advancing the documents toward a picker arm 82, at a rate determined by the speed at which the documents are removed from the input hopper 78. The picker arm 82 may be of a vacuum type that oscillates in the manner shown in dotted outline for advancing the first document in the stack toward the feed belts 84 and 86.

As the picker arm 82 advances the document toward the feed belts 84 and 86, the document 76 passes a vacuum doubles preventer 88 which serves to inhibit the feeding of any double documents by holding the double document at the entrance 90 of the vacuum doubles preventer 88. All of the foregoing elements may be mounted upon a suitable base member such as the base plate 92.

The documents 76 presented by the picker arm 82 to the flexible feed belts 84 and 86, are advanced past a magnetic reading head 94, which magnetic reading head 94 is positioned adjacent the document path formed by the feed belts. The feed belts 84 and 86 are mounted and driven by a plurality of pulleys 96 which form the document path or way. The flexible belts 84 and 86 serve to accurately and quickly transport the document past the magnetic reading head 94 and to the common document path along which the deflecting members or gates are positioned. The pulley 96 may be driven by any suitable drive means such as the driving means 98 and this rotational movement results in the advancement of the flexible feed belt 86. The flexible belt 84 is positioned in frictional engagement with the belt 86 and the motion of the belt 86 is transmitted to the belt 84. As documents 76 are injected between the belts 84 and 86, a motion of the documents 76 results which corresponds to the document path formed by the feed belts. The belts 84 and 86 are much narrower in width than the width of the document. For example, in an embodiment of the invention which was operated and constructed, the feed belts are approximately 1 inch wide.

As shown in the FIGURE 1, two documents 76 are shown being transported by the belt system. One of the documents 76 is shown passing in front of the magnetic reading head 94 and the other document is shown emerging from the document path and into the sorting area. The sorting area is shown at the right hand side of the FIGURE 1 and in detail in the FIGURE 2.

The sorting area will be discussed in detail in reference to the FIGURE 2; however, as shown in the FIGURE 1, the documents are advanced by other flexible belts such as the upper flexible belt 100 and the lower flexible belt 102. The flexible belt 100 has the pulleys 104 and 106 positioned along the document path and the pulley 108 is positioned away from the document path in such a manner that the pulleys 104, 106, and 108 form a triangular configuration. The pulley 108 is mounted upon the base member 92 in such a manner that adjusting means for providing the proper tension of the belt may be accomplished.

The lower belt 102 passes along the document path near and in engagement with the belt 100 and extends on through document turnover devices 110 and 112 to an output hopper, not shown. The pulleys 114 and 116 are positioned along the document path and the pulley 114 drives the flexible belt 102 from the drive means 98. Since the belt 102 is in frictional engagement with the belt 100, the belt 100 is also driven.

Positioned along the document path are a plurality of deflecting members or gates 118, one of which is shown (in an opened position) in the FIGURE 1.

Positioned between and within the triangular area formed by the pulleys 104, 106, and 108 is a light source 120. Light from the light source 120 will impinge upon a photo pickup tube 122 positioned on the opposite side of the document path from the light source 120. As a document breaks the light path between the light source 120 and the photo pickup device 122, the change in signal from the photo pickup device 122 may be utilized to actuate the deflecting member or gate 118 which diverts the document from the common document path into the path formed by the belt 102 and a belt 124.

As noted, the drive means 98, which may be an electric motor or other device, will drive the backup plate 80 to advance the documents toward the picker arm 82; will rotate and cause the desired motion of the pickup arm 82 at a repetitive cycle equal to the desired sorting speed; will drive the belt system formed by the initial feed belts 84 and 86; will drive the belt 82 through the pulley 114 of the secondary belt system; and, all remaining belt systems throughout the system for advancing the documents. In the case of a document jam or other condition wherein it is desired to inhibit the operation of the system, a signal on the inhibit conductor to the drive means 98 will quickly stop the motion of the drive means and the resulting linkages coupled thereto.

As shown in the FIGURE 1, the MICR (Magnetic Ink Character Recognition) decoder 126 may be of the type shown in copending application Serial No. 114,784, filed June 5, 1961, entitled "Null Dependent Symbol Recognition," now Patent No. 3,212,058, and assigned to the same assignee as the present invention. The purpose of the decoder 126 is to receive the output signal from the magnetic reading head 94 and according to the signal received, determine the pocket assignment of the check or document to be sorted. If, for example, as shown in the FIGURE 1 the gate "0" is to be selected, then the document detector "0" formed by the first set of means including the light source 120 and the photo pickup device 122 will signal the arrival of the document 76 at that point by a decreased output from the pickup device 122. The decoder 126 then utilizes this output from the pickup device 122 to actuate the gate 118 on the gate "0" conductor at the appropriate time to cause the document 76 to be diverted from the common document path into the feed path formed by the belts 102 and 124. As soon as the document has been diverted, the gate "0" signal to the gate 118 disappears and the gate 118 rotates in a counter-clockwise manner to remove itself from the common document path.

In the FIGURE 2, the documents 76 enter the sorting mechanism as shown and advance in the direction indicated by the arrows. The document path past the deflecting members or gates 118 is known as the common document path. The secondary or output document path projects from the common document path and when the gate or deflecting member 118 corresponding to the output document path is actuated, then the document 76 is deflected into the output document path and stacked in an ouput hopper, not shown. The device is constructed in such an manner that one side of the document path can, upon command, move rearwardly and thus open the document path. This opening of the document path will prevent further mutilation of the documents in the case of a jam and also provide means for easily removing the jammed document. Three such sections (three gates 118 and three output document paths) are shown in the FIGURE 2; however, it will be understood that any number of sections may be shown and in the particular embodiment that was constructed, it was found that three such sections could be conveniently mounted upon a movable plate which would move away, upon command, and open the document path.

The elements of the FIGURE 2 will now be discussed in detail. In this FIGURE, three secondary paths are shown leading from the common document path which the document 76 is shown as entering. Since the secondary paths and elements associated therewith are similar in each of the three areas, only the center area will be described in detail. The elements associated with the first secondary document path were discussed generally during the discussion of FIGURE 1. The document transporting elements forming the secondary paths to the output pockets (not shown) are mounted upon a base member 128. These are the elements shown below the common document path. The elements above the common document path and comprising the light source 120, the jam detectors 130, and the rollers forming a triangular belt path are mounted on a carriage movable member 132.

In the FIGURE 2, the deflecting members or gates 118 are positioned along the common document path. A key-shaped aperture 134 is formed in the base member 128 to receive the gate 118. The gate 118 is inserted from underneath the base member 128 with the deflecting portion of the gate extending along side the document path while the actuating solenoid and its associated supporting members remain below the surface of the base member 128. The deflecting gate 118 shown in the middle area of the FIGURE 2 is shown in its open or extended position to deflect a document while the remaining two gates are shown in their closed or non-deflecting positions. As shown in the center portion of the FIGURE 2, a pulley 116 is positioned along the common document path while a pulley 136 is positioned away from the common document path in such a manner that the belt 102 which passes over the pulleys 116 and 136 forms an angle of approximately 45 degrees away from the common document path. A V-shaped deflecting member 138 has one of its extensions extending along the common document path while the other extension of the V-shaped member 138 is positioned along the section of the belt 102 formed across the pulleys 116 and 136. This section of the member 138 serves to force the document into engagement with the belts 102 and 124 after the gate 118 has deflected the check or document into this pocket. Various other pulleys are positioned on the base member 128 to direct the deflected document to its associated output hopper.

Within the V-shaped deflecting member 138 is mounted the photo pickup device 122. An aperture is provided in the V-shaped deflecting member 138 to permit light from the light source 120, which element is positioned on the carriage or movable member 132, to be picked up by the photo pickup device 122. It will be noted that because of the angular arrangement of the light source 120 and the photo pickup device 122, no light will be received by the pickup device 12 when the carriage or movable member 132 is moved away from the common document path. The light source 120 and the photo pickup device 122 shown in the center portion of FIGURE 2, serve to detect the presence of a document which would be deposited in the next following output hopper by deflecting the gate 118 shown at the extreme right of the FIGURE 2. This arrangement will be intuitively clear since it is obvious that the presence of the check must be detected before the arrival of the document at the deflecting gate 118 associated with the desired pocket in which the check is to be deposited.

A document jam detector 130 is positioned along the common document path to detect the occurrence of a document jam. Briefly, the jam detecting mechanism 130 comprises a movable jam plate 140 which is supported by a bracket 142 and a pin 146. Positioned next to the jam plate 140 is an electrical switch 148. A jammed check will cause the jam plate 140 to be pivoted about the pin 146 and against the actuating member of the switch 148, which switch will then signal on its output conductors that a jam has occurred which immediately results in actuation of a solenoid to cause the carriage forming one side of the common document way or path to open.

The gate or diverter utilized in the present invention for diverting the documents from the common document path to the secondary path leading to an output pocket is shown in detail in the FIGURES 3, 4, 5, 6 and 7. The plan view of FIGURE 3 shows the deflecting member 118 extending through the key-shaped aperture 134 in the base member 128. The deflecting member 118 is shown in its closed position in solid outline and in its open position in broken outline as indicated at 118′.

As shown best in the FIGURE 4, the deflecting member 118 extends perpendicularly and vertically from the base member 128 and is of cantilever construction. The deflecting member 118 may be constructed of plastic or aluminum or any light material which would remain substantially rigid during operation, and which would reduce the inertia or force required to actuate the gate and cause the deflection of a document from the common document path.

The gate, as shown in the FIGURE 4, comprises a cylindrical shaft housing 250 having a portion of wider diameter at 252. This flanged portion 252 is utilized for tapping holes to secure the shaft housing 250 to the lower side of the base member 128.

It will be understood that the entire gate is usually assembled before being placed in service. After the gate is completely assembled, the deflecting member 118 is inserted into the key-shaped aperture 134 in the base member 128 with the flanged portion 252 against the lower side of the base member 128. Bolts 254 are utilized to join the gate to the base member 128. As shown in the FIGURE 5, an extended slot 256 is formed in the flanged portion 252 of the shaft housing 250, which slot 256 permits adjustment and proper positioning of the deflecting member 118 along the common document path shown in the FIGURE 2.

The shaft housing 250 of the FIGURE 4 is hollow and has a recessed portion 258 formed at its upper end which receives and supports the upper bearing 260. A lower bearing 262 is positioned within the removed portion of the shaft housing 250. The upper bearing 260 and the lower bearing 262 support a shaft 264. The shaft 264 is connected at its upper end to the vertical deflecting member 118 by insertion into a hole formed in the lower part of the deflecting member 118 and being secured thereto by a pin 266.

The deflecting member 118 is driven through the shaft 264 by a rotary solenoid 268 having a pair of conductors 270 connected thereto. As noted, the deflecting member 118 is driven by a rotary solenoid and means must be provided to secure the shaft from the solenoid to the shaft 264 as well as to some rigid element such as the shaft housing 250. In addition, means must be provided to limit the rotational movement of the solenoid shaft.

A mounting plate 272, having an aperture formed therein equal to the aperture in the shaft housing 250, is suitably secured to the lower portion and in alignment with the shaft housing 250. The diameter of the mounting plate 272 is somewhat larger than the diameter of the shaft housing at the portion at which they join so that means may be connected to the mounting plate 272 to support the solenoid 268 and its rotational limiting means. As shown in the FIGURE 4, a bolt 274 is supported vertically and parallel to the shaft 264 and connected to the mounting plate 272 in the area where the mounting plate 272 extends beyond the shaft housing 250. The bolt 274 has a removable head 276 which secures a torque arm 278 thereto. The torque arm 278 is best shown in the FIGURE 6 and is a bifurcated element having its leg extending at substantially 90 degrees to the general direction of the bifurcated elements. The function of the torque arm 278 is to provide a mounting for the solenoid 268 and still permit a small amount of axial movement of the solenoid 268. This is accomplished by constructing the torque arm 278 of some resilient material which will still permit the axial movement of the solenoid generated as a result of actuation of the solenoid 268. An aperture is provided in each of the ends of the torque arm 278. The extending portion of the torque arm is secured by the bolt 274 and the head 276 while the bifurcated elements are connected to the solenoid 268 by the bolts 280. A shaft 282 extends from the solenoid 268 and into a recessed portion formed in the lower part of the shaft 264. A stop arm 284 has a circular portion with an aperture formed therein whose diameter is equal to the diameter of the shaft 264. The stop arm 284 has an extending finger which extends into a stop 286 which is secured to the mounting plate 272. The stop arm 284 is positioned on the shaft 264 with the shaft 264 passing through the aperture in the stop arm 284. The shaft 282 from the solenoid 268 is then inserted into the aperture formed in the lower portion of the shaft 264. The assembly comprising the shaft 264, the shaft 282 and the stop arm 284 are then rigidly secured together by a pin 268 which is passed therethrough. As shown in the FIGURES 4, 6 and 7, the stop 286 is of substantially rectangular construction having a slot 290 formed therein for receiving the finger of the stop arm 284. The stop 286 is secured to the edge of the circular mounting plate 272 by the mounting screws 292. In the FIGURE 7, the finger of the stop arm 284 is shown extending through the slot 290 of the stop member 286, which stop member 286 is secured to the mounting plate 272. It will be understood that the mounting plate 272 may take a shape such as circular, square or rectangular if such is desired.

After the gate is assembled as hereinbefore described, the deflecting member 118 is passed from underneath the base member 128 and through the key-shaped aperture 134. Bolts 254 are then passed through the apertures formed in the flanged portion 252 of the shaft housing 250 and into tapped holes in the underside of the base member 128. The bolts 254 are then tightened only enough to fit snugly against the underside of the base member 128 and still permit movement between the base 128 and the flanged portion 252. The shaft housing 250 and the flanged portion 252, are then rotated (which will permit rotation within the slots 256 formed in the member 252 as shown in the FIGURE 5) to adjust and position the deflecting member 118 along the document path as shown in the FIGURE 2. The electrical leads 270 from the solenoid 268 are then connected to the decoder 126 of the FIGURE 1 and the system is ready for operation.

Thus, there has been described a system for automatically sorting documents such as bank checks. As the documents are individually and successively advanced past a magnetic reading station, the magnetic numbers formed upon the face of the check are interpreted and the document is directed to an output pocket according to the magnetic code placed thereon. High speed document sorters will operate and sort documents at upwards of 1800 documents per minute. When operating at these high speeds, it is necessary that all elements of the mechanical, as well as electrical, systems be designed to preserve the condition of the documents and to eliminate or reduce document jams. It is inevitable that a jam may occasionally occur in the system. If a document sorting operation is to be successful, the conditions causing jams must be studied and the equipment so designed as to minimize the great loss of time attributable to clearing the machine of jammed documents.

The present invention relates to a document diverter or document gate for altering the path of the documents. The sorting system is constructed in such a manner that the documents pass along a common document path or way. Means are provided at successive positions along the document path for diverting the document from the common document path into a secondary document path which leads to a stacker and the output pocket. When operating at these high speeds, it is possible that the document gate may be actuated at a rate equal to the document sorting speed if a condition should occur wherein several successive documents are to be placed in the same output hopper or pocket. Accordingly, if document jams are to be minimized and check mutilation reduced, the document gate must open quickly, divert the document from the common path to its output pocket, and then return to its cleared position before the arrival of the next document.

There has been described a document diverter or gate of the present invention which is of unitary construction. A movable shaft is secured within a housing. The deflecting member of the gate is coupled to one end of the shaft in a cantilever manner. The opposite end of the shaft is secured to a solenoid capable of rotational movement. The solenoid is connected to the housing and appropriate stops are provided to limit the rotational movement of the shaft. The gate is biased in a closed position by the elements within the solenoid. Upon actuation of the solenoid, the shaft will be rotated thus causing the diverting member of the gate to be moved from its closed position to its open position. Thus, the document is diverted to the desired output pocket.

Since the document gate of the present invention is of unitary construction, it may be quickly removed and serviced. If a document gate becomes defective and the "down time" of the sorting system is to be minimized, a second gate may be quickly reinserted and installed in the document system and the operation continued.

In addition, a decoding means for the Magnetic Ink Character Recognition symbols is provided to receive the output from a magnetic reading station for actuating one of the document gates according to the magnetic code upon the individual document.

While the invention has been particularly shown and described with reference to a preferred embodiment thereof, it will be understood by those skilled in the art that from the foregoing, other changes in form and details may be made therein without departing from the spirit and scope of the invention.

What is claimed is:

1. A document sorting system comprising, means defining a document path for transporting documents therealong, a plurality of apertures formed along said document path, and a plurality of document diverting means, each of said diverting means being separately removable as a unit, said plurality of diverting means being positioned along the document path with one diverting means per document path aperture for altering the path of the documents, each of said diverting means comprising a housing, a shaft journalled within said housing, a deflecting element supported by and longitudinally extending from said shaft, said deflecting element adapted to selectively extend through said aperture when rotated thereby to engage documents transported along the path, means supported by said housing and engaging said shaft to produce rotational movement thereof, rotational limiting means supported by said housing, and a stop arm connected to said shaft and engaging said limiting means for permitting only a predetermined rotation of said shaft.

2. The combination as defined in claim 1 wherein said means supported by said housing and engaging said shaft is a solenoid.

3. In a document sorting system including; means for advancing documents along a primary document path; means located along the primary path and forming at least one secondary document path leading from the primary path; and a document deflecting device positioned at the entrance to each means forming a secondary document path, said document deflecting device adapted for selectively diverting a document from the primary to the secondary document path, said deflecting device comprising, a housing having a central aperture, bearing means positioned within said central aperture, a rotatable shaft supported within said central aperture by said bearing means, a cantilever deflecting element supported by said shaft and in substantial alignment therewith, a solenoid having a rotating element thereof connected to said shaft, a post rigidly affixed to said housing in spatial relationship and parallel to said shaft, and resilient means connecting said solenoid to said post so that said solenoid, shaft and deflecting element are in substantial alignment.

4. The document deflector recited in claim 3 including stop means positioned upon said shaft for limiting the rotational movement of said shaft and deflecting element.

References Cited by the Examiner
UNITED STATES PATENTS

| 1,985,035 | 12/1934 | Kermode | 209—72 |
| 2,617,528 | 11/1952 | Moore | 209—74 |
| 2,618,386 | 11/1952 | Samain | 209—111.5 |
| 2,950,005 | 8/1960 | MacDonald | 209—74 |
| 3,038,604 | 6/1962 | Muller | 209—111.5 X |

ROBERT B. REEVES, *Primary Examiner.*